May 6, 1969

R. E. KORTUM 3,442,355

DISC BRAKE SYSTEM

Filed April 10, 1967

INVENTOR
ROBERT E. KORTUM
BY
Cohn and Powell

United States Patent Office 3,442,355
Patented May 6, 1969

3,442,355
DISC BRAKE SYSTEM
Robert E. Kortum, Hazelwood, Mo., assignor to Atlas Tool & Manufacturing Company, St. Louis, Mo., a corporation of Missouri
Filed Apr. 10, 1967, Ser. No. 629,503
Int. Cl. F16d 51/00, 63/00
U.S. Cl. 188—73     1 Claim

ABSTRACT OF THE DISCLOSURE

A disc brake in which a rotatable shaft, transversely aligned relative to the axis of rotation of the disc, is provided with a forked end straddling the periphery of the disc. A friction-faced block is rotatably mounted on each leg of the fork adjacent to the disc face so that rotation of the shaft brings the friction-faced blocks into frictional braking engagement with opposite faces of the disc.

A spring-loaded reciprocative arm is provided with a pin at one end which positively engages circumferential teeth on the disc to prevent rotation of the disc independently of the friction-faced blocks.

Background of the invention

This invention relates generally to improvements in a disc brake, and more particularly to a disc brake which operates effectively in a confined space such as is found in a lawn mower.

A disc brake is essentially one in which the frictional braking force is applied axially, to the circular plane face of a rotating member rather than transversely, to the rim of a rotating member. The principle involved in disc braking is simple and merely requires that sufficient force be applied to a braking member, which has a friction face engaging with the disc face, to prevent rotation of the disc. The disc is generally coupled, either directly, or indirectly, to a vehicular drive.

The problems involved in disc brake design reduce essentially to the provision of means of applying the necessary actuating force to the friction-faced braking member, especially in a confined space. A survey of disc brake systems indicates clearly that the usual method of providing the braking force is to apply a direct leverage in the form of a scissors action which is not advantageous when space is restricted. By this scissors means, force applied to actuate the lever arms is transmitted, proportionately increased, by the pressure arms to each disc face. Most disc brakes represent variations in the method used to actuate the scissors lever arms.

U.S. Patent No. 3,228,493 is a clear example of one of the many disc brake systems to utilize this scissors principle. In this device, the scissors lever arms are oppositely cammed on their inside face. Movement of a ball along the length of the scissors arm forces these arms apart and, because of the pivotal nature of the scissors action, transmits force, increased in value, to the pressure arms.

U.S. Patent No. 3,062,329 represents a deviation from general disc design in that a curved arm of horseshoe configuration is pivoted at its vertex. The horseshoe partially encloses the disc between its leg and pivotal outward movement of one leg causes pivotal inward movement of the other leg to bring the said other leg into engagement with one face of the disc. An auxiliary lever, pivotally attached to the outwardly moving leg, cooperates with a cam arrangement to engage with the other face of the disc simultaneously.

U.S. Patent No. 2,983,337 illustrates another deviation. In this device, screw means parallel with the axis of rotation of the disc, are employed to draw oppositely acting friction pads into braking engagement with opposite faces of the disc.

None of the known prior art indicates the application of pressure to friction pads by rotating the stem of a forked shaft, the stem having an axis transverse to the axis of rotation of the disc, and the pads being mounted on opposite legs of the fork adjacent to the disc. In addition, the known prior art does not disclose a disc brake utilized as a parking brake by the provision of positive stop means on the disc.

Summary of the invention

The disc cooperates with pressure pads mounted on a forked shaft to provide a foot-brake. In addition, an arm, having a projecting, coacting pin at one end, cooperates with a toothed periphery of the disc to provide a handbrake.

The forked shaft rotates about an axis substantiallly transverse to the axis of rotation of the disc, the forked portion constituting a pair of crank arms.

The forked portion of the cam straddles the disc so that each crank arm is adjacent to an opposite disc face. Rotation of the stem of the fork moves each crank arm toward its respective disc face.

Friction-faced blocks rotatably mounted on each crank arm provide a coplanar pressure surface means which engage opposite faces of the disc simultaneously to provide a braking force inhibiting rotary motion of the disc.

The fork is provided by a flange at one end of the rotatable shaft, the flange having trunnions, arranged in side by side relation, which project from the outer face of the flange.

A bracket supports the stem of the forked shaft, the bracket including two journaled legs, one of the journals having a slotted configuration to allow lateral adjustment of the shaft and enhance the self-aligning capability of the pressure blocks in the event that the friction surfaces suffer differential wear.

The shaft is provided with a radial arm at one end which provides leverage in rotating the shaft.

A spring-loaded, reciprocating arm is provided with a pin at one end, the pin positively engaging with teeth disposed around the circumference of the disc, the engagement preventing rotation of the disc independently of the pressure blocks.

The features referred to in this summary, together with numerous other advantages of the invention, will more clearly appear from the following detailed description of a preferred embodiment, particularly when considered in connection with the accompanying drawing.

Description of the preferred embodiment

Figure 1:
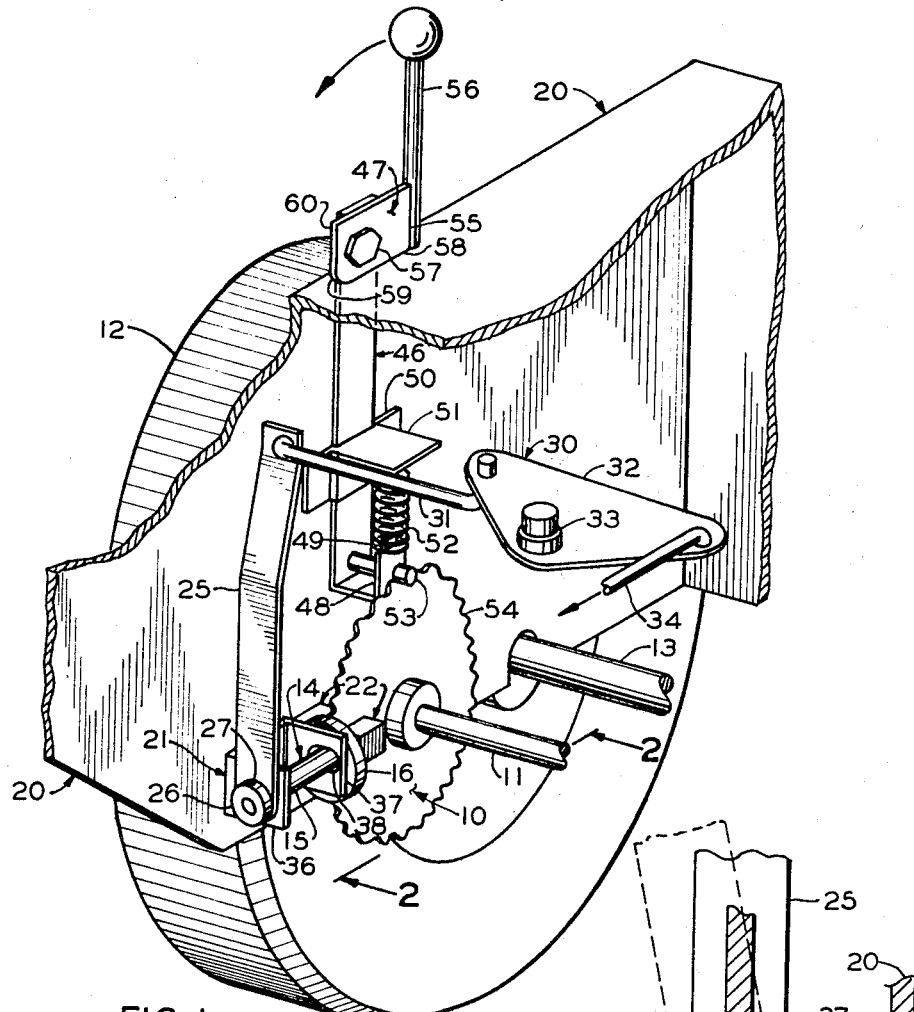
FIG. 1 is a fragmentary perspective view of the brake system embodied in a power mower transmission.

Referring now by characters of reference to the drawing, and first to FIG. 1, it will be understood that the invention includes a disc 10 fixedly mounted on the rotating transmission shaft 11 of a gear reduction unit (not shown). It will be understood that the gear reduction unit is mechanically linked to the rear wheels, one of which is designated by numeral 12, by a gear connection between the transmission shaft 11 and the rear axle 13.

The frictional-braking action is provided by means of a forked shaft 14 which includes a stem 15 rotatably mounted by the double legs of a U-shaped bracket support 21, the bracket support 21 being securely attached to the body 20 of the power mower. The forked shaft 14 includes a flange 16 at one end of the stem 15, the flange 16 being provided with trunnions 17 fixedly attached to and projecting from the outer face of the flange 16. The trunnions 17 constitute a pair of eccentric crank arms, in side by side relation, straddling the disc 10.

Figure 2:
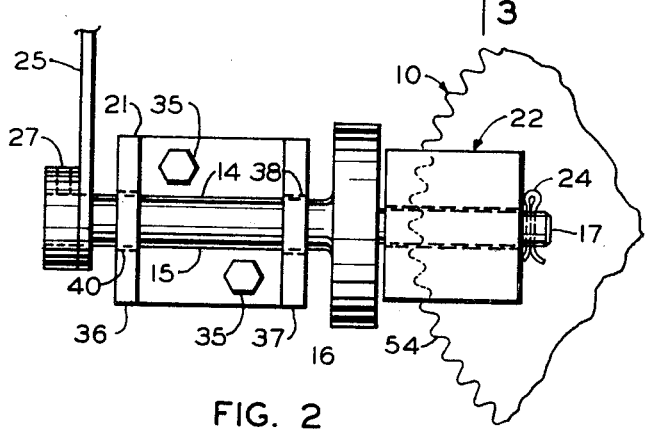
FIG. 2 is an elevational view of the forked shaft taken on line 2—2 of FIG. 1.

A friction-faced block 22 is freely and rotatably mounted on each trunnion 17, as is shown in FIG. 2, to present a pressure face 23 (FIG. 3) adjacent to one surface of the disc 10 and to permit coplanar operative engagement between the pressure face 23 and one disc face. It will be clear that the pressure face 23 may be provided by an independent friction element attached to the block 22 and disposed adjacently to a disc face or, alternatively, the block as a whole may be made from a friction material such as molded asbestos as used in the present embodiment. A stop means such as a split pin 24, limits the axial movement of each block 22 on its respectve trunnion 17.

At the other end of the forked shaft 14, is a radial arm 25. The arm 25 includes a mounting boss 26, attached to its end as by welding. A set screw 27 or other fastening means detachably secures the boss 26 to the stem 15 of the forked shaft 14.

At its other end, the radial arm 25 is connected by linkage mechanism, generally shown by numeral 30, to the foot brake pedal (not shown). The linkage 30 includes a bent rod 31 attached to one corner of a pivoted triangular plate 32. The pivot point 33 of the triangular plate 32 is fixed in location to provide means translating motion from the foot brake pedal rod 34, which is attached to the corner of the pivoted triangular plate 32, through 90 degrees to the bent rod 31 and hence to the radial arm 25.

The bracket support 21 is attached to the body 20 by means of fasteners 35. The support bracket 21 includes two outstanding legs 36 and 37, the legs being provided with journal means to mount the forked shaft 14. The journal means in outstanding leg 37 is provided by slot 38 which, in cooperation with the circular journal 40 in the outstanding leg 36, acts as a pivot, to provide an adjustment means for self-alignment of the blocks 22. This self-alignment and provision accommodates differential wear of the pressure faces 23.

A hand brake system is provided as generally denoted by numeral 47. An actuating means for the hand brake mechanism includes a reciprocating arm 46 received in a slot (not shown) provided in the upper portion of the body 20. The reciprocating arm 46 is slidably received in a guide bracket 50, the guide bracket 50 being secured to the sidewall of the body 20. At its lower end the reciprocating arm 46 is reversably bent to form an upwardly projecting portion 48. The guide bracket 50 is provided with an outstanding leg 51 which forms an abutment means providing an attachment for one end of a compression spring 52, constituting a resilient means. The other end of the compression spring 52 is retained by a spigot 49 provided at the upper end of the reversibly bent, upwardly projecting portion 48 of the reciprocating arm 46. Holes are provided in opposite sides of the bight at the lower end of the reciprocating arm 46 to provide a support means for a projecting pin 53, constituting a blocking member, which engages with circumferential teeth 54 provided on the periphery of disc 10. The disc teeth 54 move between the blocks 22.

A stop means 55 is pivotally connected by pin 57 to the upper end of the reciprocating arm 46. A parking brake lever 56 is attached to the stop means 55. In the upright position of lever 56 as shown in FIG. 1, the margin 58 seats on the body 20 to determine the locked position of pin 53 with the disc teeth 54. When the lever 56 is swung downwardly as indicated by the arrow, a cam corner 59 engages the body 20 and raises the arm 46 to release the pin 53 from the disc teeth 54. In the unlocked position, the margin 60 will seat on the body 20.

Figure 3:
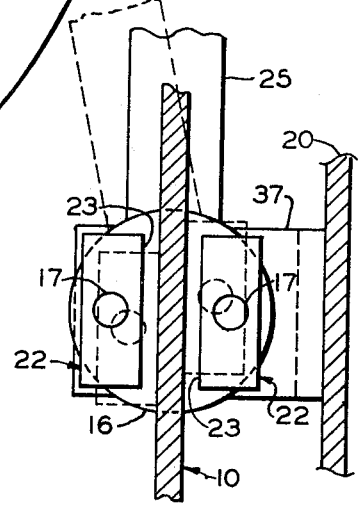
FIG. 3 is a view taken on line 3—3 of FIG. 2 and illustrates the braking engagement in phantom outline.

The foot brake is operated by exerting a pull to the foot brake pedal rod 34 and the pull is transmitted by linkage mechanism 30 to the radial arm 25 attached to one end of the rotatable forked shaft 14. The forked end of the shaft 14 includes two trunnions 17 which straddle the disc 10 in such a way as to present each disc face with a pressure face 23 of the block 22 mounted on each trunnion 17. The adjacent relationship between each pressure face 23 and one of the disc faces permits coplanar operative engagement between these faces when the forked shaft 14 is rotated. FIG. 3 shows in phantom outline the disposition of the blocks 22 and the radial arm 25 when braking engagement occurs.

A slot 38 is provided in outsanding leg 37 of the support bracket 21, the slot 38 providing a self-adjustment by allowing the shaft 14 to pivot laterally about the journal means in the other outstanding leg 36. This lateral pivoting capability enables pressure contact between the friction-faced blocks 22 to be maintained notwithstanding the fact that differential wear may occur on each pressure face 23.

FIG. 1 illustrates the parking brake 47 in its engaged, locking position. Pivoting the parking brake lever 56 moves the reciprocating arm 46 upwardly in the guide bracket 50 and compresses the compression spring 52. The movement of the arm 46 disengages the pin 53 from the disc teeth 54 disposed around the circumference of the disc 10. It will be clear that engagement of the pin 53 with the disc teeth 54 provides a positive stop means preventing rotation of the disc 10.

I claim as my invention:
1. A brake system comprising:
   (a) a rotatable disc,
   (b) a friction-faced, pressure surface means,
   (c) a rotatable means, rotating about an axis substantially transverse to the axis of rotation of the disc, operatively connected to the pressure surface means, rotation of the rotatable means operatively engaging the pressure surface means with the rotatable disc,
   (d) the rotatable means including a shaft having a flange at one end,
   (e) a pair of trunnions projecting from the flange in adjacent side-by-side relation to each other, each trunnion having an axis substantially parallel to and offset from the shaft,
   (f) the pressure means including a block rotatably mounted on each trunnion, each block having a friction face oriented to permit coplanar operative engagement with opposite faces of the disc,
   (g) a leverage means including a radial arm operatively attached to the shaft in spaced relation from the flange,
   (h) a support means rotatably mounting the shaft, the support means including adjustment means adjustably aligning the shaft laterally to accommodate differential wear between the respective friction faces of the block and the disc,
   (i) the support means including a pair of spaced legs, each leg including journal means receiving the shaft, and

(j) the journal means in one leg including a slot permitting free lateral movement of the shaft therein, and the journal means in the other leg receiving the shaft in pivotal relation, the two journal means being substantially aligned with the plane of the disc and cooperating to provide the adjustment means laterally self-aligning the shaft and the block with the disc.

References Cited

UNITED STATES PATENTS

| 1,940,845 | 12/1933 | Conner et al. | |
| 2,466,688 | 4/1949 | Culver. | |
| 3,226,129 | 12/1965 | McKinley | 188—73 X |
| 3,241,637 | 3/1966 | Temple | 188—69 |

FOREIGN PATENTS

| 1,203,061 | 10/1965 | Germany. |
| 544,237 | 6/1956 | Italy. |

GEORGE E. A. HALVOSA, *Primary Examiner.*

U.S. Cl. X.R.

188—68